L. E. SAUNDERS & J. G. PETRIKIN.
PROCESS OF TREATING ALUMINOUS MATERIALS.
APPLICATION FILED MAR. 27, 1907.
902,255.
Patented Oct. 27, 1908.
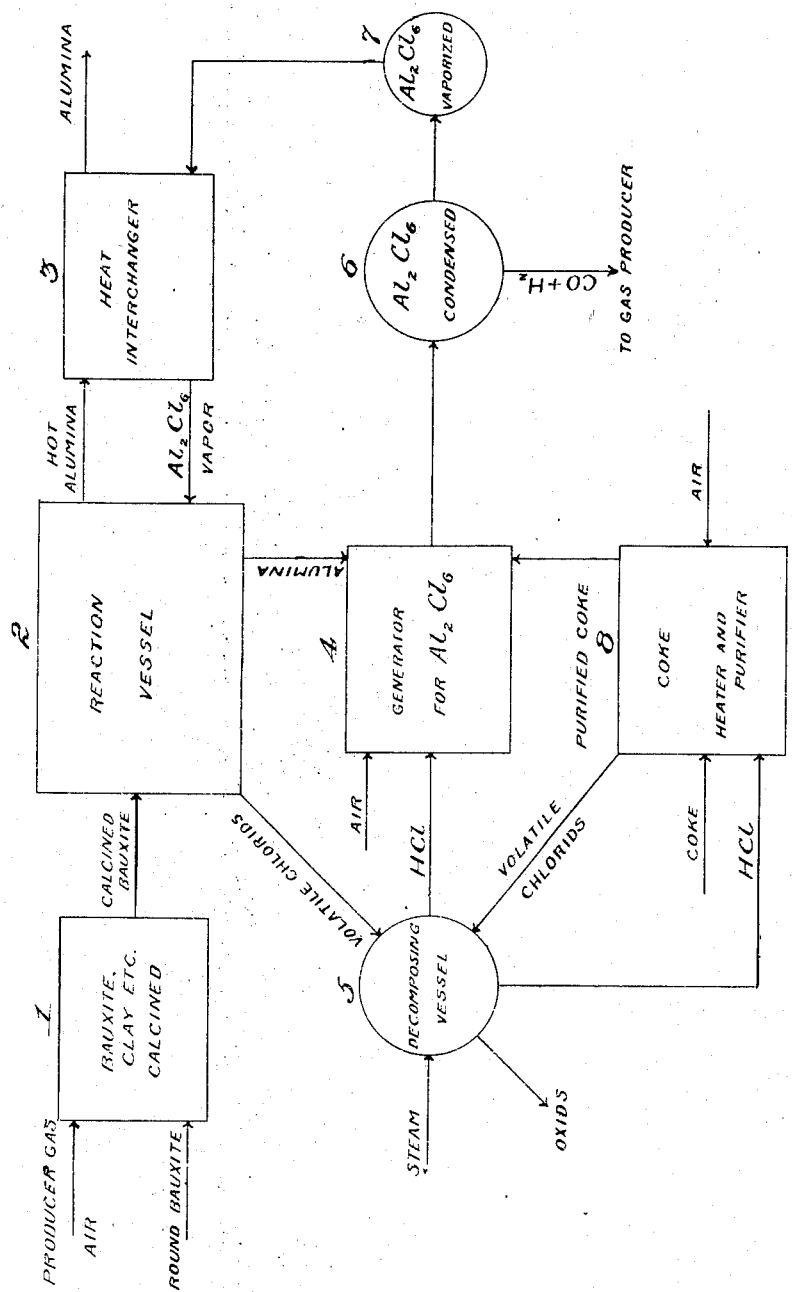

UNITED STATES PATENT OFFICE.

LEWIS E. SAUNDERS, OF NIAGARA FALLS, NEW YORK, AND JACOB G. PETRIKIN, OF LOCK HAVEN, PENNSYLVANIA.

PROCESS OF TREATING ALUMINOUS MATERIALS.

No. 902,255.　　　　　Specification of Letters Patent.　　　　Patented Oct. 27, 1908.

Application filed March 27, 1907. Serial No. 364,911.

*To all whom it may concern:*

Be it known that we, (1) LEWIS E. SAUNDERS and (2) JACOB G. PETRIKIN, citizens of the United States, residing at (1) Niagara Falls, county of Niagara, State of New York, and (2) Lock Haven, county of Clinton, State of Pennsylvania, have invented certain new and useful Improvements in Processes of Treating Aluminous Materials, of which the following is a specification.

The object of this invention is to provide a process of treating aluminous materials, such for example as bauxite or clay, to separate therefrom part or all of the elements other than aluminum which are capable of yielding volatile chlorids, the elements of this type commonly present being iron, silicon and titanium in the form of oxids or oxygen-containing compounds. According to the invention such elements are separated by reacting on the aluminous material with aluminum chlorid at suitable temperatures above the vaporizing points of the chlorids of iron, silicon and titanium, the reaction resulting in the production of chlorids of these elements and of oxid of aluminum according to the equations:

(1) $Al_2Cl_6 + Fe_2O_3 = Al_2O_3 + Fe_2Cl_6$
(2) $2Al_2Cl_6 + 3SiO_2 = 2Al_2O_3 + 3SiCl_4$
(3) $2Al_2Cl_6 + 3TiO_2 = 2Al_2O_3 + 3TiCl_4$.

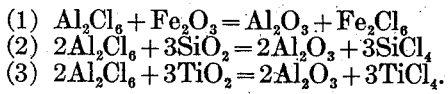

According to the preferred form of the invention the aluminous material is calcined and subjected at a temperature sufficient to initiate the reaction, say 800° C. or less, to a stream or current of aluminum chlorid vapor, and the chlorids of iron, silicon and titanium, or of such of these elements as may be present, are continuously withdrawn from the reaction vessel. Preferably these chlorids are treated for the production of hydrochloric acid or chlorin to be utilized in the preparation of additional quantities of aluminum chlorid, thus rendering the process cyclical in character.

In order that the invention may be fully understood it will be described by reference to one embodiment thereof, it being understood that the invention is not restricted to the steps of the cyclical process described.

Reference is made to the accompanying drawing in which the several steps of a cyclical process embodying and illustrating the invention are diagrammatically indicated.

Ground bauxite, clay or other aluminous material is calcined in a suitable kiln 1, which may be of the gas-fired rotary type, and is transferred hot to a reaction vessel 2 which may likewise comprise a rotary drum, preferably having a lining of basic material as alumina. In the vessel 2 the hot aluminous material is subjected to a current of aluminum chlorid vapor, with the result that alumina is produced or separated from the vapor, and any iron, silicon and titanium which may be present are separated as volatile chlorids. A portion of the residue in the reaction vessel, which in case all of the iron, silicon and titanium are transformed into chlorids consists of substantially or commercially pure alumina derived from the original aluminous material and from the aluminum chlorid, is transferred to a heat-interchanger 3, where its heat is utilized for raising the temperature of the aluminum chlorid for the reaction, the aluminum chlorid vapor being thereby superheated above its vaporizing point. Another portion of the alumina from the vessel 2 is transferred to the aluminum chlorid generator 4 and utilized for the preparation of the aluminum chlorid required for treating or purifying the aluminous material. The proportion of the alumina required for this purpose will depend upon the character of the original aluminous material and the proportion of iron, silicon and titanium therein.

The volatile chlorids from the reaction vessel 2 may be withdrawn to a vessel 5 and decomposed therein by steam with the production of hydrochloric acid, which may be utilized for the production of further quantities of aluminum chlorid, being passed for this purpose in contact with ignited alumina and coke in the generator 4. The aluminum chlorid produced may be condensed at 6 and the carbon monoxid, hydrogen and other fixed gases thus separated may be conducted to the gas producer and utilized for the calcination of the raw material. The aluminum chlorid is then again vaporized as indicated at 7, superheated in the heat-interchanger 3, and passed into the reaction vessel 2. As thus described the process is cyclical in character, but it will be understood that the invention is not restricted to this particular procedure, and that the aluminum chlorid required for the treatment or purification of the aluminous material may be derived from any source and vaporized or heated in any desired manner.

It is preferable to purify the coke prior to its introduction into the generator 4, and this is conveniently accomplished by igniting it in a furnace 8 in a current of gaseous hydrochloric acid, conveniently derived from the decomposing vessel 5 above referred to; such treatment yields volatile chlorids of iron and silicon which are preferably returned to the same or other decomposing vessel, and therein treated for the production of hydrochloric acid which may be utilized as above described.

The reaction in the vessel 2, comprising the conversion of the vapor of aluminum chlorid into alumina and the production and volatilization of chlorids of iron, silicon and titanium is exothermic in character, and may be maintained in a vessel suitably protected against radiation without supply of heat other than that conveyed by the freshly calcined and highly heated bauxite or clay and the superheated vapor of aluminum chlorid. Heat may however be supplied to the material in this vessel from other sources if found desirable or necessary.

We claim:

1. The process of treating aluminous materials to separate therefrom elements yielding volatile chlorids, which consists in forming chlorids of such elements by reacting upon said aluminous materials with aluminum chlorid, and volatilizing said chlorids.

2. The process of treating aluminous materials to separate therefrom elements yielding volatile chlorids, which consists in heating the aluminous material and reacting thereon with aluminum chlorid vapor.

3. The process of treating aluminous materials to separate therefrom elements yielding volatile chlorids, which consists in heating the aluminous material and reacting thereon with aluminum chlorid vapor superheated above its vaporizing point.

4. The process of treating aluminous materials to separate therefrom elements yielding volatile chlorids, which consists in forming chlorids of such elements by reacting with aluminum chlorid, volatilizing said chlorids, converting the same into a chloridizing agent, and reacting therewith on alumina to produce aluminum chlorid.

5. The process of treating aluminous materials to separate therefrom elements yielding volatile chlorids, which consists in forming chlorids of such elements by reacting with aluminum chlorid, volatilizing said chlorids, converting the same into a chloridizing agent, and reacting therewith on a portion of the residual alumina to produce aluminum chlorid.

6. The process of heating aluminous materials to separate therefrom elements yielding volatile chlorids, which consists in forming chlorids of such elements by reacting with aluminum chlorid, volatilizing said chlorids, converting the same into a chloridizing agent, reacting therewith on a portion of the residual alumina to produce aluminum chlorid, and reacting with the aluminum chlorid thus produced upon further portions of the aluminous material.

7. The process of treating aluminous materials to separate therefrom elements yielding volatile chlorids, which consists in forming chlorids of such elements by reacting upon said aluminous materials with aluminum chlorid superheated above its vaporizing point, and volatilizing said chlorids.

8. The process of treating aluminous materials to separate therefrom elements yielding volatile chlorids, which consists in vaporizing aluminum chlorid, superheating the vapors, and reacting with the same on heated aluminous material.

9. The process of treating aluminous materials to separate therefrom elements yielding volatile chlorids, which consists in vaporizing aluminum chlorid, superheating the vapors, and reacting with the same on hot, freshly calcined bauxite.

10. The process of treating aluminous materials to separate therefrom elements yielding volatile chlorids, which consists in vaporizing aluminum chlorid, superheating the vapors by passing them in contact with highly heated alumina, and reacting with the same on hot, freshly calcined bauxite.

11. The process of treating aluminous materials to separate therefrom elements yielding volatile chlorids, which consists in calcining an aluminous material, reacting thereon with aluminum chlorid, and effecting a heat interchange between the resulting alumina and the aluminum chlorid vapor to be used for the reaction.

In testimony whereof, we affix our signatures in presence of two witnesses.

LEWIS E. SAUNDERS.
JACOB G. PETRIKIN.

Witnesses for Saunders:
CLINTON P. TOWNSEND,
CHAS. H. POTTER.

Witnesses for Petrikin:
E. P. GEARY,
B. F. GEARY.